(12) United States Patent
Ieda et al.

(10) Patent No.: US 8,139,446 B2
(45) Date of Patent: Mar. 20, 2012

(54) AUDIO SYSTEM

(75) Inventors: Kuniyo Ieda, Tokyo (JP); Tatsuya Mitsugi, Tokyo (JP); Yoshihiko Utsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2478 days.

(21) Appl. No.: 10/819,148

(22) Filed: Apr. 7, 2004

(65) Prior Publication Data

US 2004/0218514 A1 Nov. 4, 2004

(30) Foreign Application Priority Data

Apr. 18, 2003 (JP) ................... 2003-114429

(51) Int. Cl.
*H04H 60/27* (2008.01)
(52) U.S. Cl. ............ 369/7; 369/292; 381/107; 381/104
(58) Field of Classification Search .............. 369/292, 369/7, 1, 2; 381/107, 104, 123
See application file for complete search history.

(56) References Cited

U.S. PATENT DOCUMENTS 6,636,609 B1* 10/2003 Ha et al. .................. 381/104
2007/0291959 A1* 12/2007 Seefeldt .................. 381/104
2008/0253587 A1* 10/2008 Une ........................ 381/107

FOREIGN PATENT DOCUMENTS

| JP | 2-89252 A | 3/1990 |
| JP | 6-36460 A | 2/1994 |
| JP | 2002-185276 A | 6/2002 |

* cited by examiner

*Primary Examiner* — Ali Neyzari
(74) *Attorney, Agent, or Firm* — Birch, Stewart, Kolasch & Birch, LLP

(57) ABSTRACT

An audio system includes a key input section and a microcomputer, and enables playback volume level control that will meet the demand of a user. The key input section inputs a selection instruction for selecting one of a plurality of sound sources in response to a manipulation. The microcomputer 6, in cooperation with a level adjusting ratio setting library, a level adjusting pattern generator and a volume adjuster, selects the sound source designated by the selection instruction, calculates the level difference $\Delta P$ between the playback volume level of the sound data of the current piece of music and that of the next piece of music of the selected sound source, and adjusts the playback volume level of the next sound data in accordance with an adjusting ratio corresponding to the level difference.

17 Claims, 17 Drawing Sheets

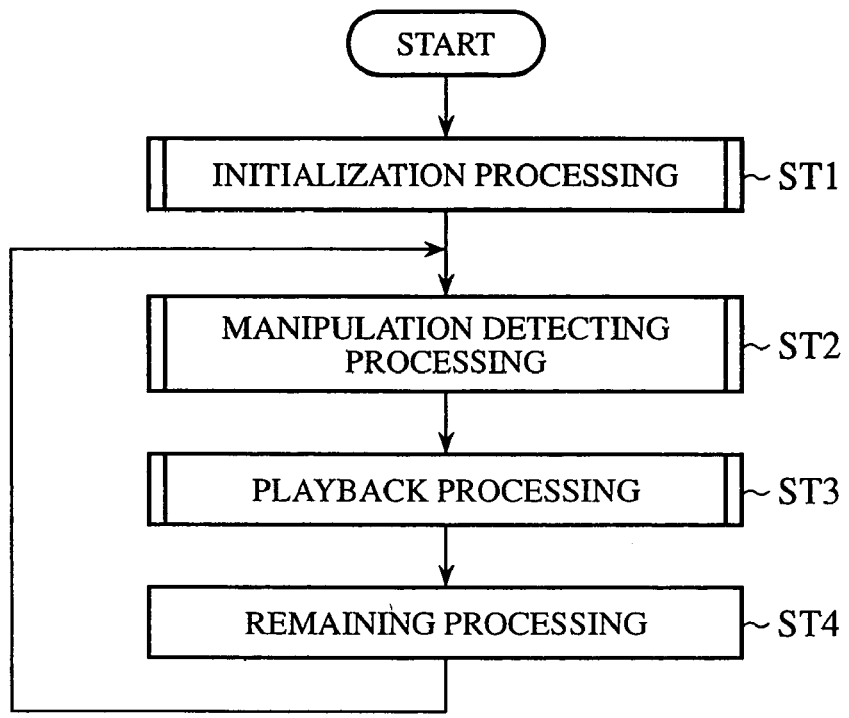
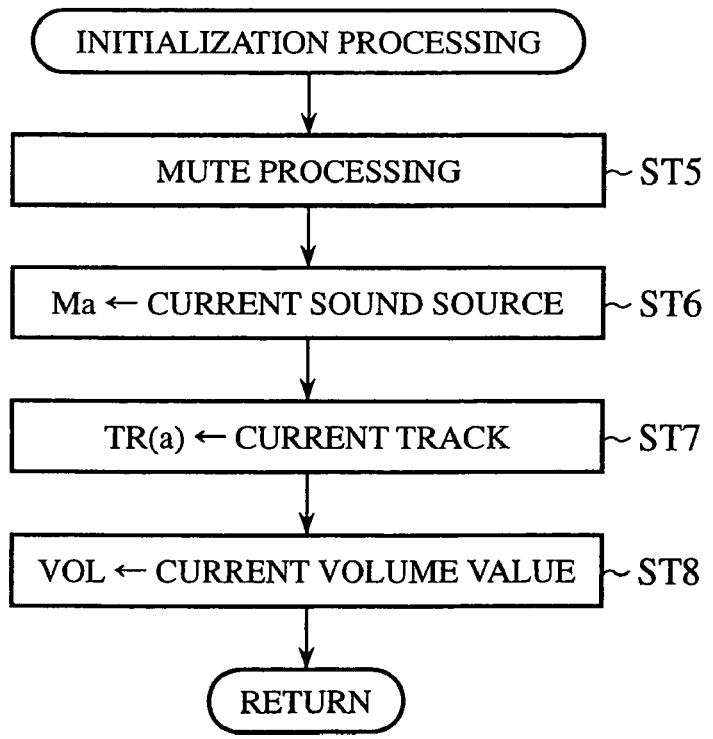

FIG.13

| SOUND SOURCES | MEMORIES | SOUND SIGNAL LEVEL STORED IN INDIVIDUAL MEMORIES (dB) | | | |
|---|---|---|---|---|---|
| | | TRACK 1 | TRACK 2 | TRACK 3 | ○ ○ ○ ○ ○ |
| M1 | Data1 | 69 | 55 | 76 | ○ ○ ○ ○ ○ |
| M2 | Data2 | 40 | 53 | 57 | ○ ○ ○ ○ ○ |
| M3 | Data3 | 74 | 69 | 72 | ○ ○ ○ ○ ○ |
| M4 | Data4 | 61 | 69 | 75 | ○ ○ ○ ○ ○ |
| M5 | Data5 | 42 | 60 | 53 | ○ ○ ○ ○ ○ |
| ⋮ | ⋮ | ⋮ | ⋮ | ⋮ | ⋮ |
| Mn | Datan | 59 | 71 | 54 | ○ ○ ○ ○ ○ |

FIG.15 ptype,

AUDIO SYSTEM

BACKGROUND OF THE INVENTION

1. Field of the Invention

The present invention relates to an audio system that controls sound data.

2. Description of Related Art

As for a CD player or CD changer for playing back a CD (compact disk), a technique is proposed which stabilizes its volume level by automatically adjusting the tendency of the playback volume level at every appropriate breakpoint of record information such as a piece of music or disk. One of the disk playback systems of such proposals includes a record volume tendency detecting means for detecting the general tendency of the record volume level in the record information between the breakpoints from a disk playback signal; a playback volume adjusting means for variably adjusting the playback volume level of the disk playback signal; and a playback volume control means for stabilizing the general tendency of the playback volume level of the record information at every breakpoint by controlling the playback volume adjusting means in response to the tendency of the record volume level detected. With such a configuration, since the general tendency of the playback volume level is stabilized at every breakpoint such as a piece of music or disk, it is not necessary for a user to adjust the gain of the amplifier, thereby improving the ease of use (see, Relevant reference 1, for example)

Relevant reference 1: Japanese patent application laid-open No. 6-36460 (Paragraphs [0006] and [0009])

However, a user has a general tendency that once he or she adjusts the playback volume level to a desired level during the playback of the first sound data (such as the first piece of music of a CD, or the first piece of music selected), the user wishes that the playback volume level of the subsequent playback sound data be controlled at nearly the same level as that of the first playback sound data. The conventional system that stabilizes the general tendency of the playback volume level at every breakpoint of the record information, however, has a problem of being unable to meet such a demand of the user.

SUMMARY OF THE INVENTION

The present invention is implemented to solve the foregoing problem. It is therefore an object of the present invention to provide an audio system enabling the playback volume control that can meet the demand of the user.

According to one aspect of the present invention, there is provided an audio system including: manipulation means for inputting a selection instruction for selecting one of a plurality of sound sources that supply sound data including music data on a piece of music and a broadcast signal received; sound source selection means for selecting a sound source designated by the selection instruction; and volume adjusting means for calculating a level difference between a playback volume level of first sound data currently played back and a playback volume level of second sound data to be played back next in the sound source selected by the sound source selection means, and for adjusting the playback volume level of the second sound data in accordance with an adjusting ratio set in response to the level difference.

Thus, it offers an advantage of being able to carry out the playback volume level control that will meet the demand of the user.

BRIEF DESCRIPTION OF THE DRAWINGS

FIG. 2 is a flowchart illustrating a main routine executed by the microcomputer of FIG. 1;

FIG. 3 is a flowchart illustrating the initialization processing in FIG. 2;

FIG. 13 is a table illustrating data about average detection levels stored in a memory in the embodiment 5 in accordance with the present invention;

FIG. 15 is a table illustrating a structure of the data stored in the level difference memory in FIG. 14;

DETAILED DESCRIPTION OF THE PREFERRED EMBODIMENTS

The invention will now be described with reference to the accompanying drawings.

Embodiment 1

Figure 1:
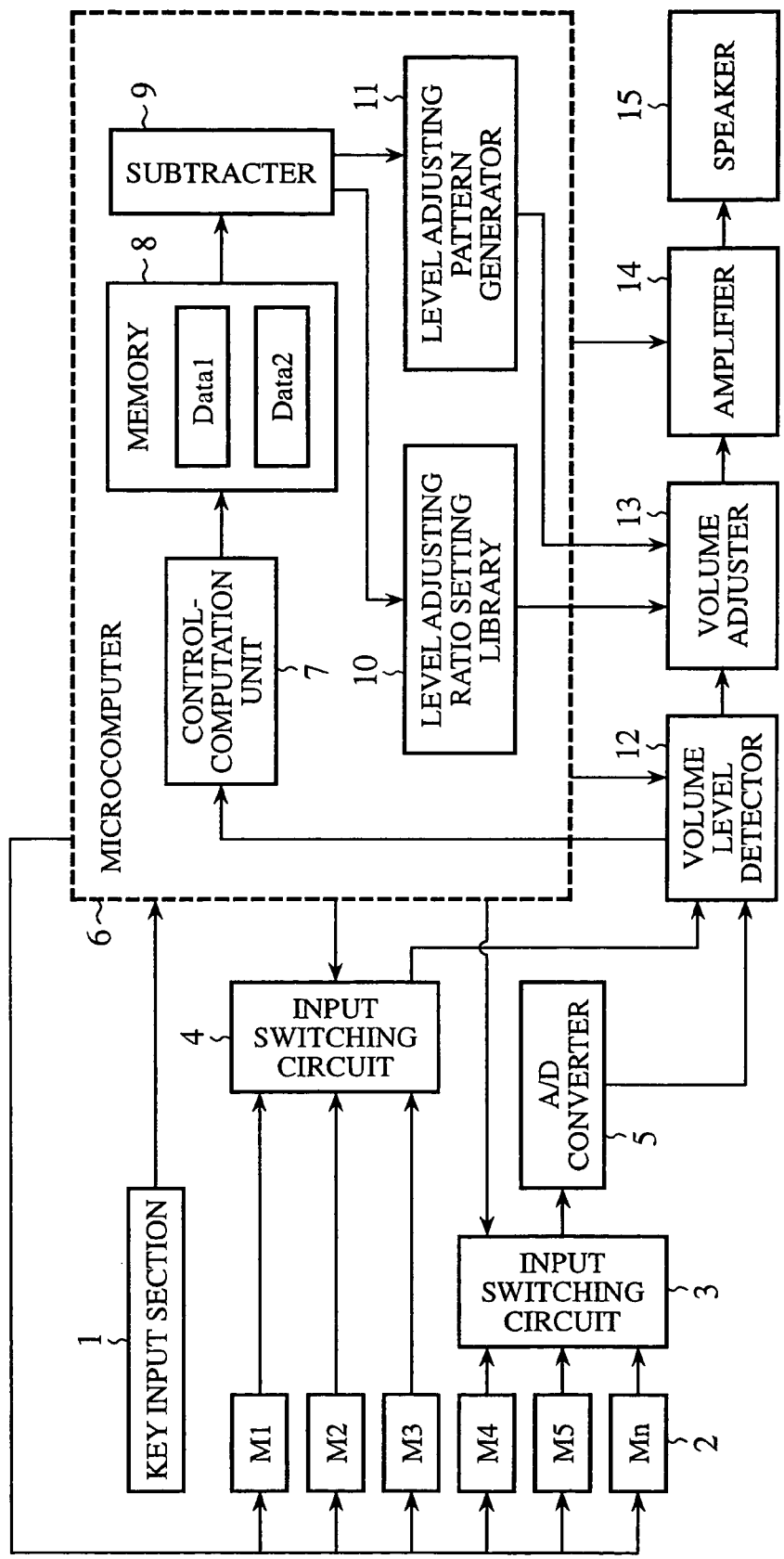
FIG. 1 is a block diagram showing a configuration of an embodiment 1 of the audio control system in accordance with the present invention.

FIG. 1 is a block diagram showing a configuration of an embodiment 1 of the audio system in accordance with the present invention. In FIG. 1, a microcomputer (sound source selecting means and volume adjusting means) 6 controls the audio system in its entirety. Sound sources 2 are composed of n types of sound sources M1, M2, M3, M4, M5, . . . , and Mn such as a disk player for driving a disk like a CD or MD for providing music information about pieces of music, a tape player for driving a digital cassette tape or analog cassette tape, and a radio receiver for receiving AM, FM or digital sound broadcast. In the example of FIG. 1, it is assumed that the sound sources M1, M2 and M3 provide digital sound data, and the sound sources M4, M5, . . . , and Mn provide analog sound signals.

A key input section (manipulation means) 1, which is composed of a set of instruction keys and a numeric keypad, is used to input to the microcomputer 6 various operation instructions by user manipulations such as power on, sound source selection and start of playback. For example, a selection instruction for selecting one of the plurality of sound sources is input to the microcomputer 6. The microcomputer 6 generates a switching control signal for the sound source selection in response to the selection instruction. An input switching circuit 3 selects one of the analog sound sources M4, M5, . . . and Mn in response to the switching control signal from the microcomputer 6. An A/D converter 5 converts the analog sound signal output from the input switching circuit 3 to digital sound data. An input switching circuit 4 selects one of the digital sound sources M1, M2 and M3 in response to the switching control signal from the microcomputer 6.

A volume level detector 12 selects one of the sound data output from the input switching circuit 4 and the sound data output from the A/D converter 5 in response to the selection control signal of the microcomputer 6. The volume level detector 12 also detects the playback volume level of the sound data selected, and supplies it to the microcomputer 6. In the microcomputer 6, a control-computation unit 7 carries out control computation to enable the microcomputer 6 to perform calculation as to the playback volume level supplied from the volume level detector 12. A memory 8 has memory areas Data1 and Data2 for storing the data about the playback volume level output from the control-computation unit 7. For example, the memory 8 stores the playback volume level of the piece of music A of the CD in the Data1, and the playback volume level of the piece of music B to be played back after the piece of music A in the Data2.

A subtracter 9 calculates a level difference by subtracting the playback volume level of the Data2 from that of the Data1 in the memory 8. A level adjusting ratio setting library (volume adjusting means) 10 has a library (table) of adjusting ratios of the volume adjustment corresponding to the level difference, and sets the level adjusting ratio in response to the level difference from the subtracter 9. In addition, in response to the level difference from the subtracter 9, a level adjusting pattern generator (volume adjusting means) 11 produces a pattern of the level adjusting ratio that is set by the level adjusting ratio setting library 10.

A volume adjuster (volume adjusting means) 13 carries out the volume adjustment for the sound data output from the volume level detector 12 in response to the level adjusting ratio determined by the level adjusting ratio setting library 10, and to the adjusting pattern output from the level adjusting pattern generator 11. An amplifier 14 amplifies the sound data passing through the volume adjustment by the volume adjuster 13 in accordance with the amplification factor provided by an amplification control signal. The amplification control signal, which is fed from the microcomputer 6, corresponds to the volume adjustment instruction from the key input section 1. The amplified signal is output from a speaker 15. Although the amplifier 14 includes a D/A converter and filters, their description will be omitted here because they are well known.

Next, the operation of the present embodiment 1 will be described.

FIG. 2 is a flowchart illustrating a procedure of the main routine of the microcomputer 6. When the power is turned on by the manipulation of the key input section 1, an initialization processing is carried out at first (step ST1). Subsequently, the following processings are executed iteratively: a manipulation detecting processing for detecting manipulation of the key input section 1 (step ST2); a playback processing for playing back the sound data fed from the sound source (step ST3); and a remaining processing such as insertion and extraction of a medium such as a CD, MD and cassette tape, tuning of the radio receiver and indication processing (step ST4).

FIG. 3 is a flowchart illustrating the initialization processing in the main routine of FIG. 2. First, the microcomputer 6 carries out a mute processing for suppressing the sound production from the speaker 15 by switching off the output from the amplifier 14 (step ST5). Subsequently, the microcomputer 6 registers the current sound source number selected before the power-on in the register M(a) (step ST6), the current track number in the register TR(a) (step ST7), and the current volume level in the register VOL (step ST8). Then, it returns the processing to the main routine of FIG. 2.

Figure 4:
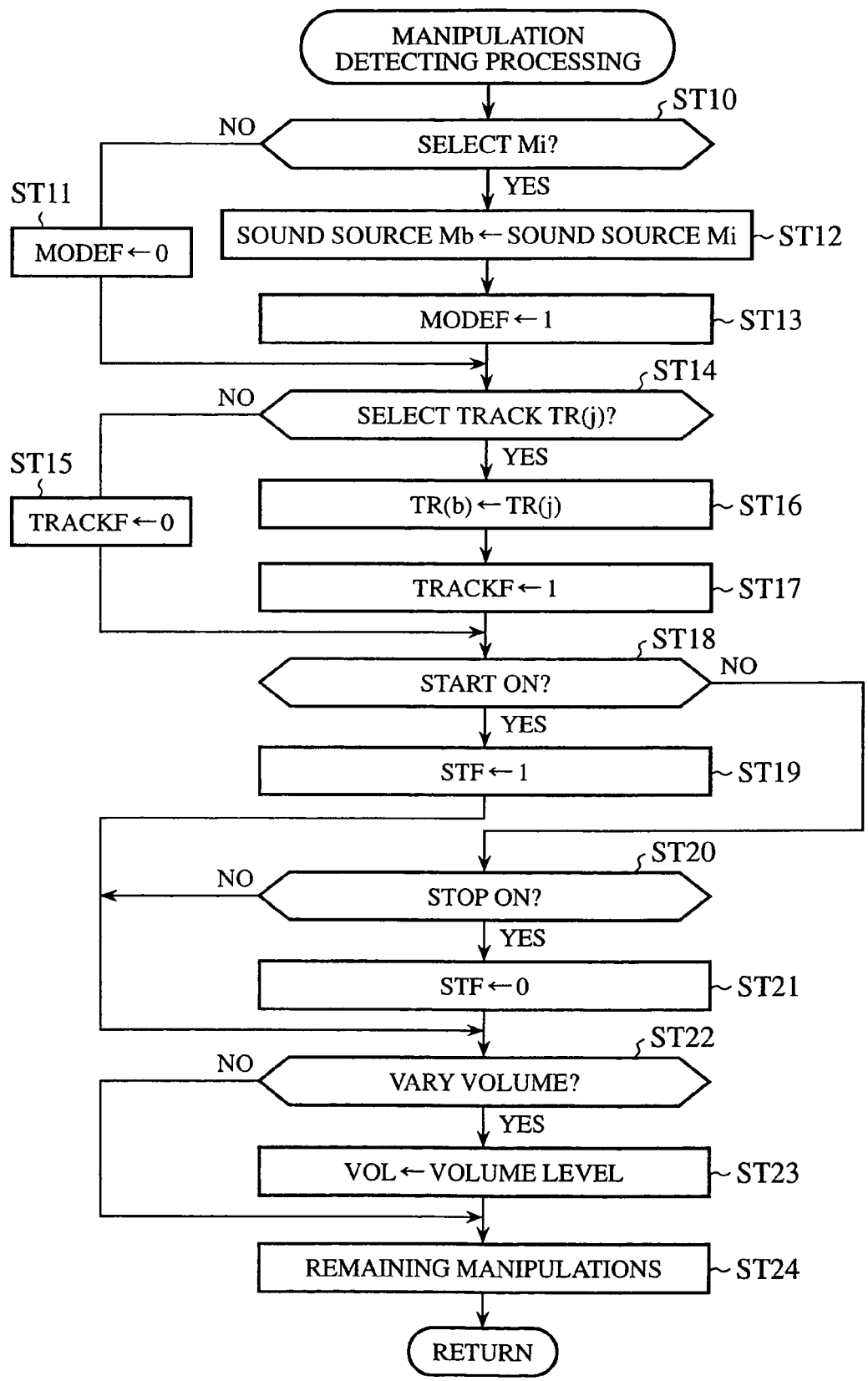
FIG. 4 is a flowchart illustrating the manipulation detecting processing in FIG. 2.

FIG. 4 is a flowchart illustrating the manipulation detecting processing of the main routine of FIG. 2. The microcomputer 6 makes a decision as to whether any one of the sound sources Mi is selected or not (step ST10). When selected, the microcomputer 6 stores the sound source number Mi in the register M(b) that specifies the sound source to be played back next (step ST12). Then, the microcomputer 6 sets the flag MODEF for changing the sound source (mode) at "1" (step ST13). Subsequently, the microcomputer 6 makes a decision as to whether a track TR(j) is newly selected by the manipulation of selecting a piece of music on the disk (step ST14). If selected, the microcomputer 6 stores the track TR(j) number in the register TR(b) (step ST16). Then the microcomputer 6 sets the flag TRACKF indicating the change of the track at "1" (step ST17).

Subsequently, the microcomputer 6 makes a decision as to whether a start key is turned on to start the playback (step ST18). If the key is turned on, the microcomputer 6 sets the flag STF indicating the start of the playback at "1" (step ST19). In addition, the microcomputer 6 makes a decision as to whether a stop key is turned on or not during the playback (step ST20), and resets the flag STF at "0" when the stop key is turned on (step ST21). Subsequently, the microcomputer 6 makes a decision as to whether the volume is varied or not (step ST22). If it is varied, the microcomputer 6 stores the volume level after the change in the register VOL (step ST23). Then, the microcomputer 6 detects the remaining manipulations such as ejection of a CD, MD or cassette tape, and band switching or tuning of the radio receiver (step ST24), and returns to the main routine of FIG. 2.

Figure 5:
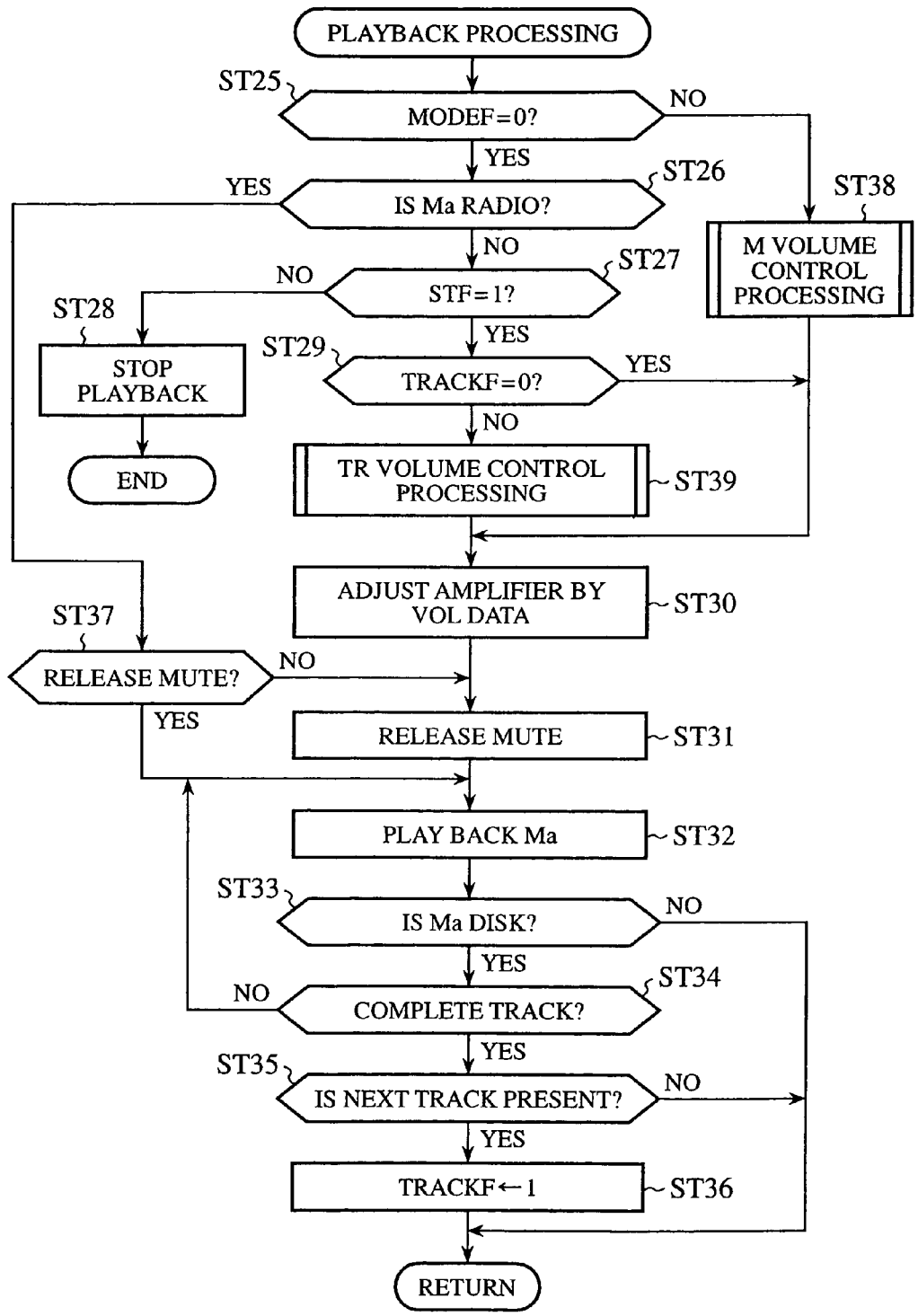
FIG. 5 is a flowchart illustrating the playback processing in FIG. 2.

FIG. 5 is a flowchart illustrating the playback processing of the main routine. The microcomputer 6 makes a decision as to whether the flag MODEF is "0" (no change in the sound source) or not (step ST25). If the flag is "0", the microcomputer 6 makes a decision as to whether the sound source number in the register M(a), which specifies the current sound source, is the radio or not (step ST26). If the register M(a) does not indicate the radio, that is, if the register M(a) indicates a disk such as a CD or MD or a cassette tape, the microcomputer 6 makes a decision as to whether the flag STF is "1" (playback) or not (step ST27). If the flag STF is "0" (stop playback), the microcomputer 6 halts the playback (step ST28), and returns to the main routine of FIG. 2.

In contrast, if the flag STF is "1", the microcomputer 6 makes a decision as to whether the flag TRACKF is "0" (no change in the piece of music) or not (step ST29). If the flag is "0", the microcomputer 6 adjusts the gain of the amplifier 14 by the volume level of the VOL (step ST30). Subsequently, the microcomputer 6 releases the mute (step ST31), and plays back the sound source whose number is indicated by the register M(a) (step ST32). For example, when the CD is selected and the start key is turned on during power-on, the first piece of music on the CD is played back, because the TR(a) stores the first piece number of music.

Subsequently, the microcomputer 6 makes a decision as to whether the register M(a) indicates the disk or not (step ST33). If it indicates the disk, the microcomputer 6 makes a decision as to whether the track (piece of music) has been completed or not (step ST34), and continues the playback of step ST32 if it has not yet been completed. If the track has been completed, the microcomputer 6 makes a decision as to whether the next track is present or not (step ST35). If the next track is present, the microcomputer 6 sets the flag TRACKF at "1" (change in the piece of music) (step ST36). The microcomputer 6 returns to the main routine of FIG. 2 after setting the flag, or when the next track is not present, or when the register M(a) indicates the cassette tape rather than the disk in the decision at step ST33.

When the register M(a) indicates the radio as the sound source in the decision at step ST26, the microcomputer 6 makes a decision as to whether the mute is released or not (step ST37). At first, the mute processing has been carried out by the initialization processing. In this case, the microcomputer 6 releases the mute (step ST31), and turns on the radio designated by the register M(a) as the sound source (step ST32). After the mute is released, the performance of step ST32 is continued. Thus, when the radio is selected as the sound source, it is played as long as the sound source is not changed.

When the decision is made at step ST25 that the flag MODEF is "1" (change in the sound source), the microcomputer 6 carries out the M volume adjustment in response to the change in the sound source (step ST38). In addition, when the decision is made at step ST29 that the flag TRACKF is "1" (change in the piece of music), the microcomputer 6 carries out the TR volume adjustment in response to the change in the piece of music (track) (step ST39).

Figure 6:
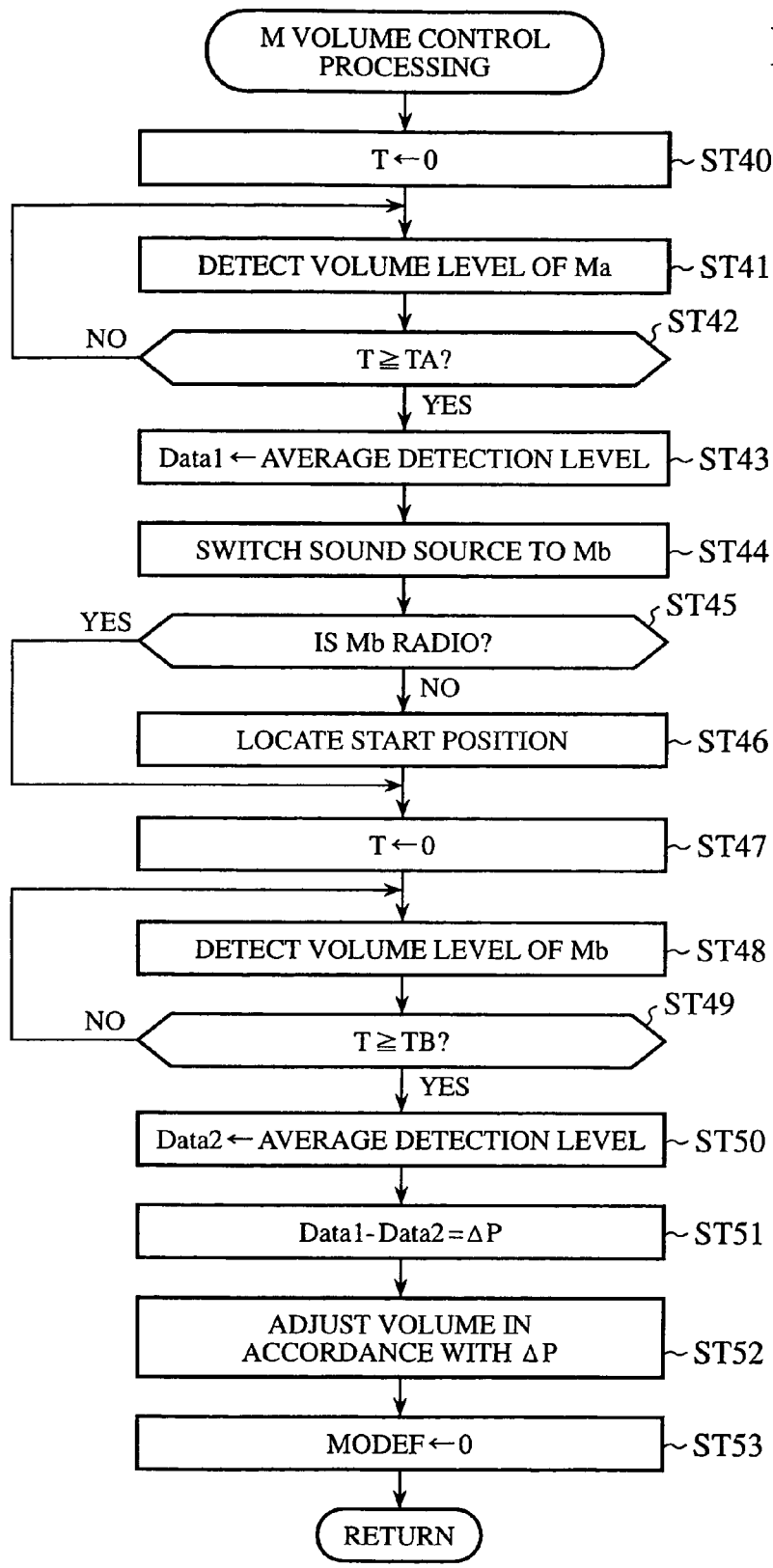
FIG. 6 is a flowchart illustrating the M volume adjusting processing in FIG. 5.

FIG. 6 is a flowchart illustrating the M volume adjustment at step ST38 in the playback processing of FIG. 5. First, the microcomputer 6 clears the timer register T to "0" which is incremented at every timer interrupt caused at regular time intervals (step ST40). Then, the microcomputer 6 detects the volume level of the current sound source designated by the register M(a) (step ST41), and makes a decision as to whether the value of the timer register T reaches a specified time TA (step ST42). When the value does not reach TA, the microcomputer 6 continues the volume level detection at step ST41. In contrast, when the value of the timer register T reaches TA, the microcomputer 6 calculates the average of the detection levels during the time TA, and stores it in the memory area Data1 of the memory 8 (step ST43).

Subsequently, the microcomputer 6 switches the sound source to a sound source designated by the register M(b) (called sound source Mb from now on for the sake of simplicity) (step ST44), which is specified as the sound source Mi to be played back next via the key input section 1. In this case, the microcomputer 6 makes a decision as to whether the sound source Mb indicates the radio or not (step ST45). If it is not the radio, but the disk or tape, the microcomputer 6 carries out the fast forward of the optical pickup or tape to locate the start of the sound data of the sound source Mb (step ST46). After the location of the start, or when the sound source Mb is the radio, the microcomputer 6 clears the value of the timer register T to "0" (step ST47). Then, the microcomputer 6 detects the volume level of the sound source Mb (step ST48), and makes a decision as to whether the value of the timer register T reaches a specified time TB (step ST49). If it has not yet been reached the time TB, the microcomputer 6 continues the volume level detection at step ST48. In contrast, if the value of the timer register T reaches the time TB, the microcomputer 6 calculates the average of the detection levels during the time TB, and stores it in the memory area Data2 of the memory 8 (step ST50).

Subsequently, the microcomputer 6 subtracts the average detection level in the Data2 from the average detection level in the Data1 to calculate the level difference ΔP (step ST51). Then the microcomputer 6 carries out the volume adjustment in response to the calculated level difference ΔP (step ST52). Specifically, it supplies the level difference ΔP fed from the subtracter 9 to the level adjusting ratio setting library 10 and level adjusting pattern generator 11 in FIG. 1, and carries out the volume adjustment of the sound data of the sound source Mb supplied from the volume level detector 12 to the volume adjuster 13. For example, assume that the average detection level in the Data1 about a piece of music A is 70 dB, and the average detection level in the Data2 about a piece of music B to be played back next is 40 dB. In this case, since the level difference ΔP is 30 dB, the microcomputer 6 carries out the volume adjustment by increasing the playback volume level of the piece of music B by 30 dB. After the volume adjustment, the microcomputer 6 resets the flag MODEF to "0" (step ST53). Then it returns to the flowchart of the playback processing of FIG. 5.

Although not shown in FIG. 6, after calculating the average detection level during the time TB and storing it in the Data2 in the start position location processing at step ST46, the microcomputer 6 must return the optical pickup or cassette tape by an amount corresponding to the fast forward, thereby preparing for the start of the actual playback.

Figure 7:
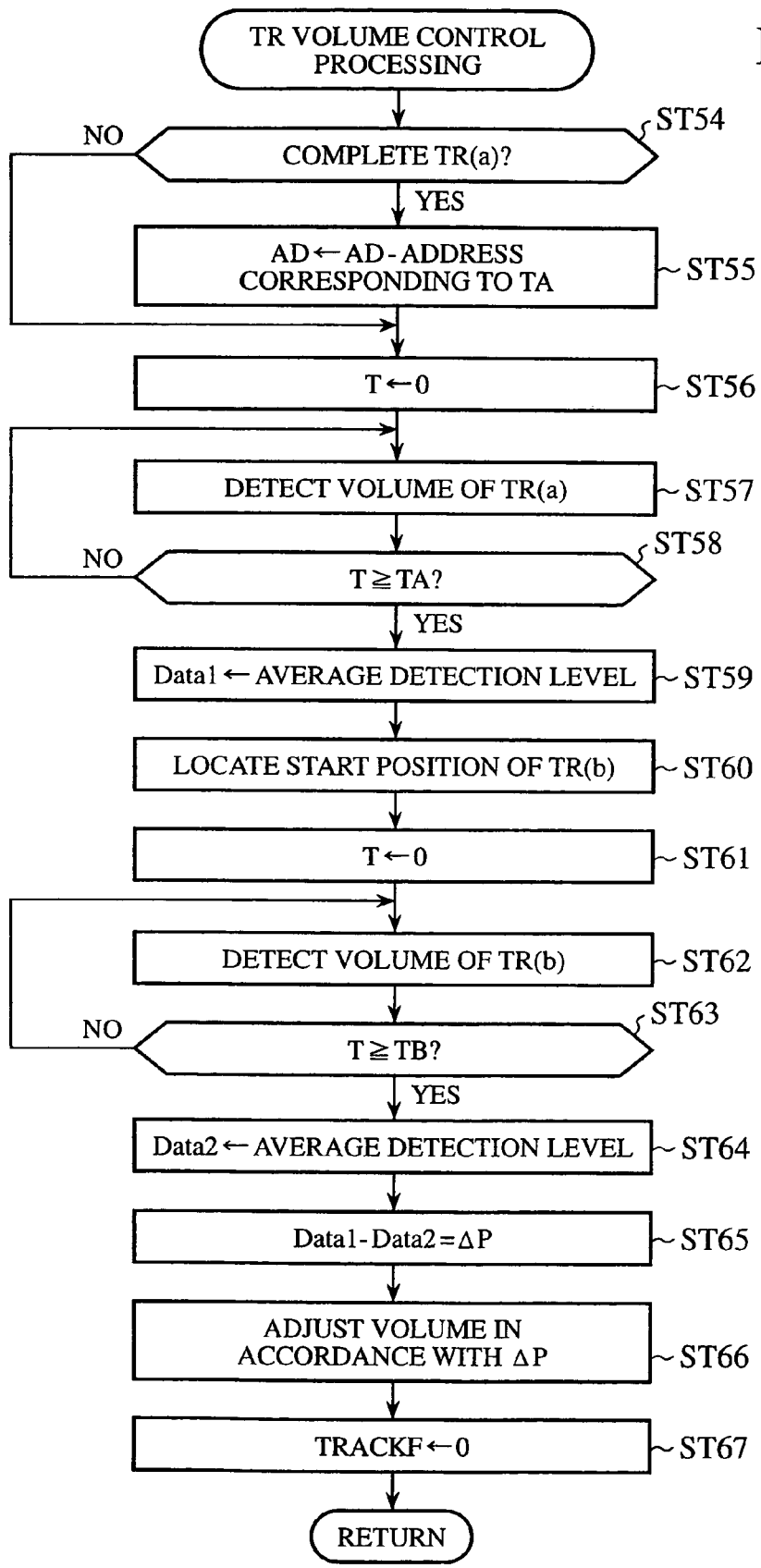
FIG. 7 is a flowchart illustrating the TR volume adjusting processing in FIG. 5.

FIG. 7 is a flowchart illustrating the TR volume adjustment at step ST39 in the playback processing of FIG. 5, which accompanies the change in the track (piece of music) of the playback disk such as the CD or MD. The TR volume adjustment will be described here by way of example of the playback of the disk. First, the microcomputer 6 makes a decision as to whether the playback of the current track TR(a) has been completed or not (step ST54). If it has been completed, the microcomputer 6 returns the address AD by an amount corresponding to the final specified time TA in the track (step ST55). In contrast, when the playback of the current track TR(a) has not yet been completed, that is, when the track change manipulation is carried out during the playback of the track TR(a) from the key input section 1, the processing at step ST55 can be skipped.

Subsequently, the microcomputer 6 clears the timer register T to "0" which is incremented at every timer interrupt caused at regular time intervals (step ST56). Then, the microcomputer 6 detects the volume level of the current track TR(a) (step ST57), and makes a decision as to whether the value of the timer register T reaches the specified time TA (step ST58). When the value has not yet reached TA, the microcomputer 6 continues the volume level detection at step ST57. In contrast, when the value of the timer register T has reached TA, the microcomputer 6 calculates the average of the detection levels during the time TA, and stores it in the memory area Data1 of the memory 8 (step ST59).

Subsequently, the microcomputer 6 locates the start of the track TR(b) (step ST60). Then the microcomputer 6 clears the value of the timer register T to "0" (step ST61), detects the volume level of the sound source Mb (step ST62), and makes a decision as to whether the value of the timer register T has reached the specified time TB (step ST63). If it has not yet been reached the time TB, the microcomputer 6 continues the volume level detection at step ST62. In contrast, if the value of the timer register T has reached the time TB, the microcomputer 6 calculates the average of the detection levels during the time TB, and stores it in the memory area Data2 of the memory 8 (step ST64).

Subsequently, the microcomputer 6 subtracts the average detection level in the Data2 from the average detection level in the Data1 to calculate the level difference $\Delta P$ (step ST65). Then the microcomputer 6 carries out the volume adjustment in response to the calculated level difference $\Delta P$ (step ST66). Specifically, it supplies the level difference $\Delta P$ fed from the subtracter 9 to the level adjusting ratio setting library 10 and level adjusting pattern generator 11 in FIG. 1, and carries out the volume adjustment of the sound data of the sound source Mb supplied from the volume level detector 12 to the volume adjuster 13. After the volume adjustment, the microcomputer 6 resets the flag TRACKF to "0" (step ST67). Then it returns to the flowchart of the playback processing of FIG. 5.

As described above, the present embodiment 1 includes the key input section 1 (manipulation means) for inputting in response to the manipulation of a user the selection instruction for selecting one of the plurality of sound sources M1-Mn for providing sound data such as the music data or broadcast data; and the volume adjusting means, which consists of the microcomputer 6, the level adjusting ratio setting library 10, the level adjusting pattern generator 11 and the volume adjuster 13, for selecting the sound source Mi in accordance with the selection instruction, for calculating the level difference $\Delta P$ between the playback volume level of the sound data of the current piece of music (track) TR(a) (first sound data) and the playback volume level of the sound data of the next piece of music (track) TR(b) (second sound data), and for adjusting the playback volume level of the next sound data in accordance with the adjusting ratio determined in response to the level difference $\Delta P$. Therefore the present embodiment 1 offers an advantage of being able to adjust the playback volume level to the level that will meet the demand of the user by matching the playback volume level of the next sound data to that of the previous sound data whose volume level has been adjusted to a desired playback volume level.

In this case, the microcomputer 6 offers an advantage of being able to calculate the level difference between the playback volume levels of the two pieces of music easily. This is because when the playback of the sound data of the current piece of music is completed, and is switched to the sound data of the next piece of music, the microcomputer 6 plays back an initial portion of the next piece of music, detects its playback volume level, and then detects the playback volume level after returning to the playback location.

Embodiment 2

Figure 8:
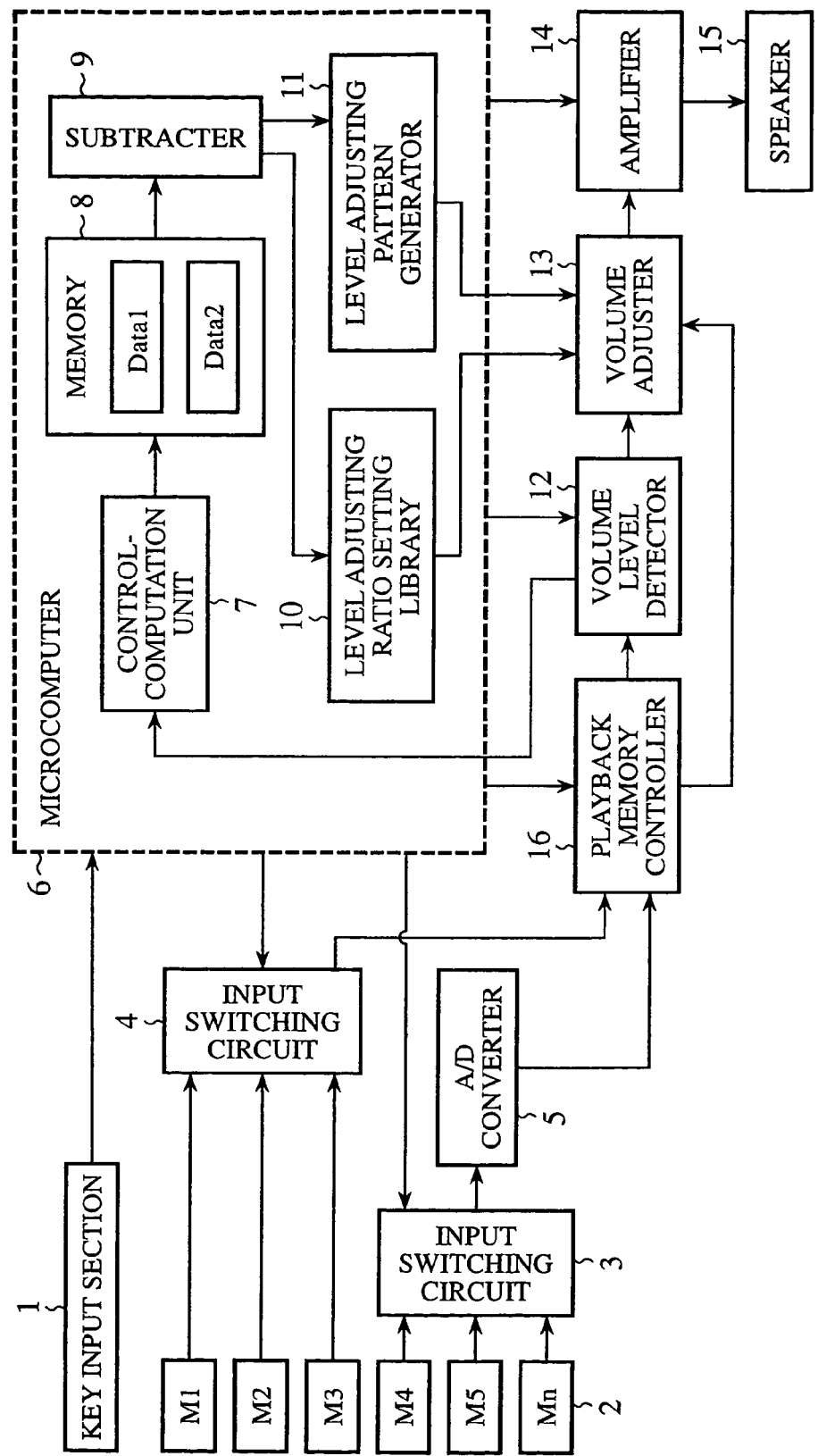
FIG. 8 is a block diagram showing a configuration of an embodiment 2 of the audio control system in accordance with the present invention.

FIG. 8 is a block diagram showing a configuration of an embodiment 2 of the audio control system in accordance with the present invention. In FIG. 8, the same components as those of the embodiment 1 as shown in FIG. 1 are designated by the same reference numerals, and the description thereof is omitted here. In FIG. 8, a playback memory controller 16 is newly added. The playback memory controller 16 stores the sound data of one of the digital sound sources M1-M3, which is output from the input switching circuit 4, or the sound data of one of the analog sound sources M4-Mn except for the radio sound source, which is output from the input switching circuit 3 and is converted to the digital data through the A/D converter 5.

Next, the operation of the present embodiment 2 will be described.

The flowcharts of the main routine and subroutines of the microcomputer 6 are substantially the same as those of the embodiment 1. The present embodiment 2, however, differs in that when the disk sound source is selected, for example, and the sound data is switched from the sound data of the piece of music A to that of the piece of music B, the playback memory controller 16 stores the sound data of the piece of music B, thereby enabling the playback volume level to be obtained from the sound data.

As described above, the present embodiment 2 offers an advantage of being able to adjust the playback volume level to the level that can meet the demand of the user as in the foregoing embodiment 1. In addition, the present embodiment 2 is configured such that it includes the playback memory controller 16 for storing the sound data supplied from the sound source, and that the microcomputer 6 calculates, when the sound source is switched from the current sound data to the next sound data, the level difference between them by reading the playback volume level of the current sound data which is stored in the playback memory controller 16. Therefore when switching from the piece of music A to the piece of music B, for example, the present embodiment 2 can obviate the need for carrying out the mechanical operation of moving the optical pickup to detect the playback volume level of the piece of music B, but can read the playback volume level of the piece of music B from the playback memory controller 16 only through electrical processing, and can calculate the level difference $\Delta P$ between the piece of music A and the piece of music B, thereby offering an advantage of being able to adjust the volume in a very short time.

Embodiment 3

Figure 9:
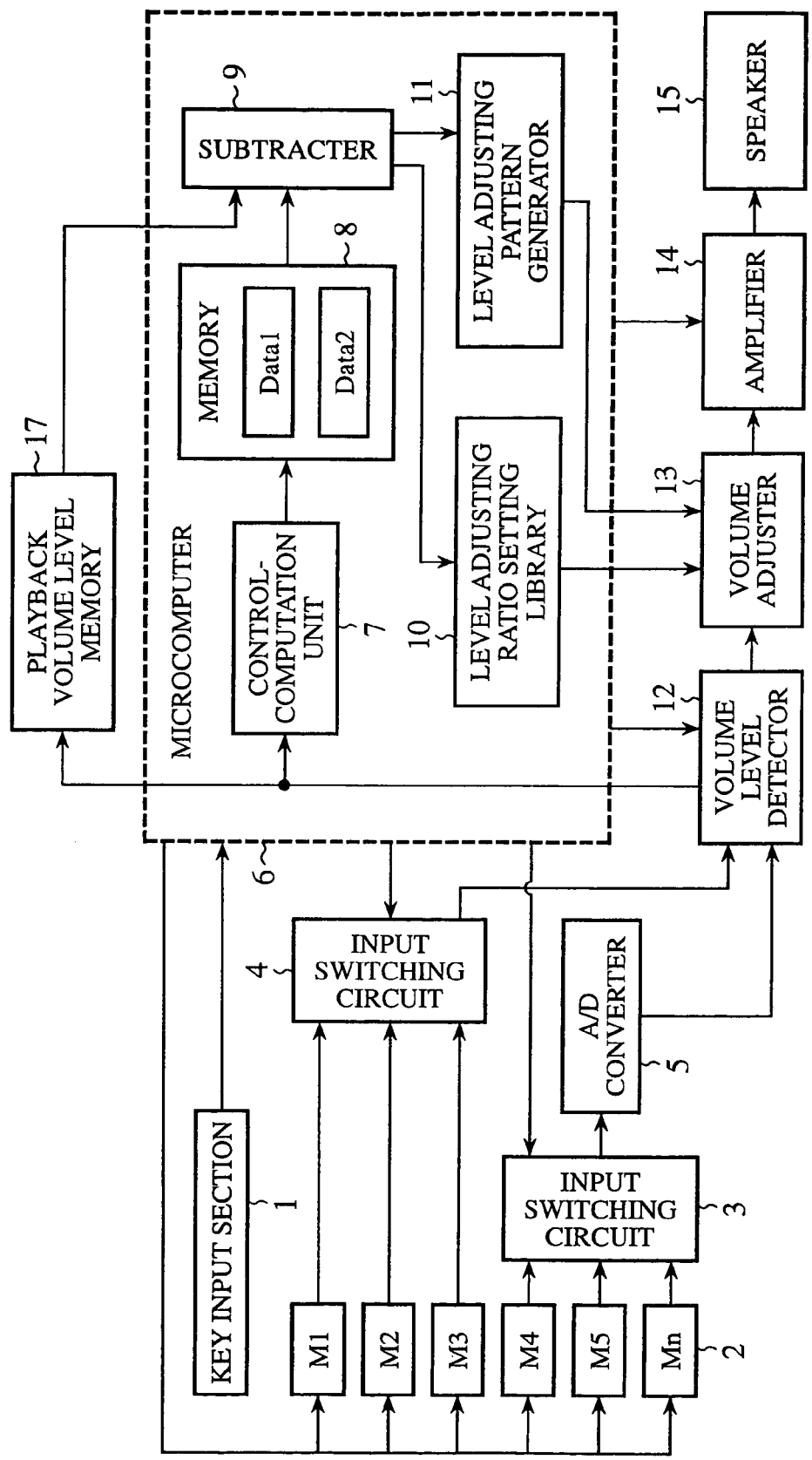
FIG. 9 is a block diagram showing a configuration of an embodiment 3 of the audio control system in accordance with the present invention.

FIG. 9 is a block diagram showing a configuration of an embodiment 3 of the audio control system in accordance with the present invention. In FIG. 9, the same components as those of the embodiment 1 as shown in FIG. 1 are designated by the same reference numerals, and the description thereof is omitted here. In FIG. 9, a playback volume level memory 17 is newly added. The playback volume level memory 17 stores the playback volume level of the current sound data. Specifically, the playback volume level of the current sound data, which is detected by the volume level detector 12, is supplied not only to the control-computation unit 7, but also to the playback volume level memory 17 to be stored.

Next, the operation of the present embodiment 3 will be described.

Figure 10:
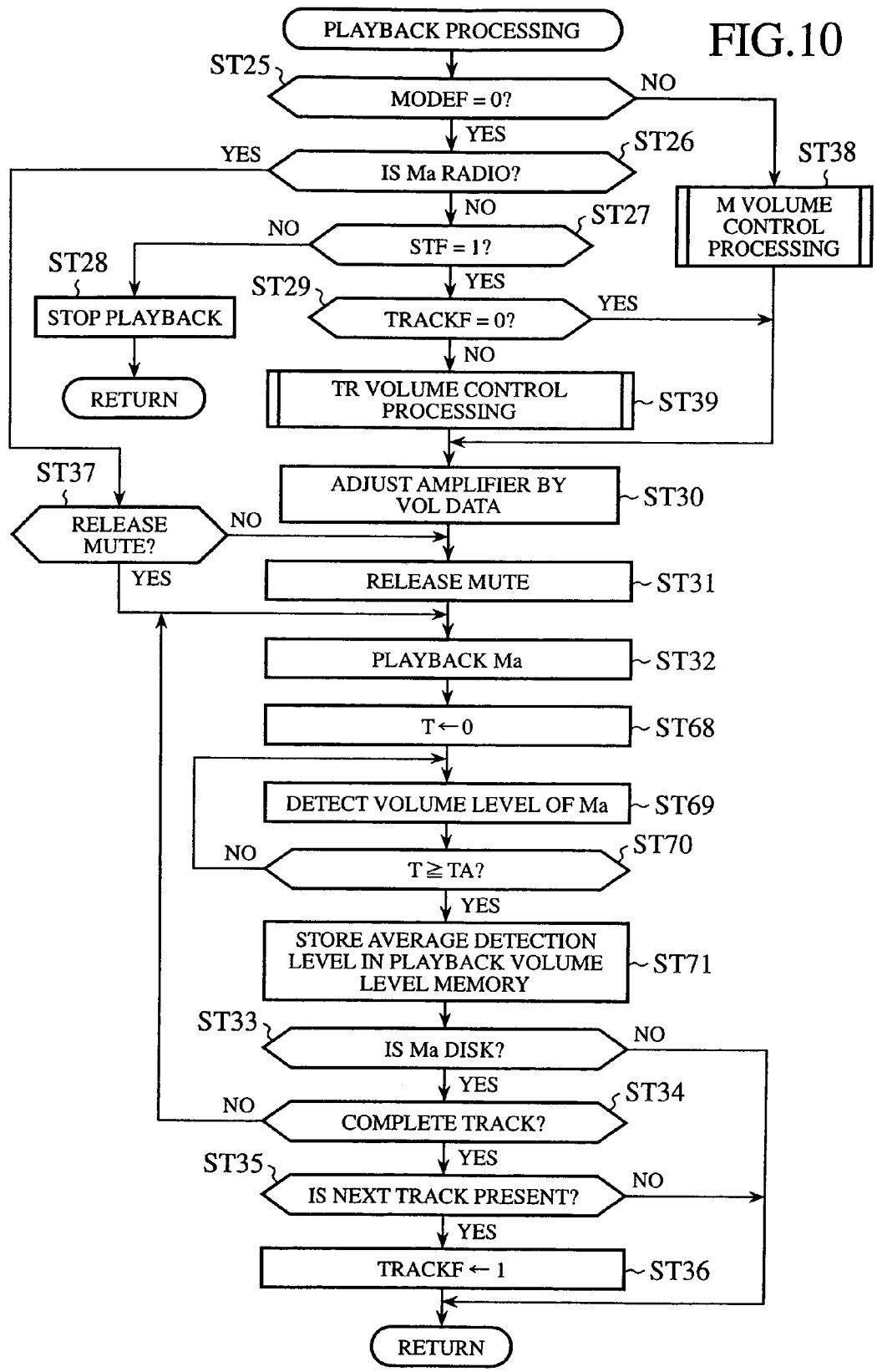
FIG. 10 is a flowchart illustrating the playback processing of the microcomputer in the embodiment 3.

FIG. 10 is a flowchart illustrating the playback processing of the microcomputer 6 of the embodiment 3. In the flowchart, the same blocks as those of the playback procedure in the embodiment 1 as shown in FIG. 5 are designated by the same reference numerals, and the description thereof is omitted here. In FIG. 10, steps ST68-ST71 are added.

At step ST32, when one of the sound sources which is designated by the register M(a) is played back, the microcomputer 6 clears the value of the timer register T to "0" (step ST68), and detects the playback volume level of the sound source designated by the register M(a) (step ST69). Then the microcomputer 6 makes a decision as to whether the value of the timer register T reaches the specified time TA or not (step ST70). If it reaches the time TA, the microcomputer 6 stores the average detection level in the playback volume level memory 17 (step ST71). For example, consider the case where the playback volume level of the sound data of the sound source M1 is stored in the playback volume level memory 17 during its playback, followed by the playback of the sound data of the sound source M2, and the playback of the sound data of the sound source M1, again. In this case, since the average detection level of the sound data of the sound source M1 has already been stored in the playback volume level memory 17, it is necessary only to store the average detection level of the sound data of the sound source M2 to the Data1. Thus, the level difference $\Delta P$ can be calculated by only subtracting the average detection level stored in the playback volume level memory 17 from the average detection level stored in the Data1.

As described above, the present embodiment 3 offers an advantage of being able to adjust the playback volume level to the level that can meet the demand of the user as in the foregoing embodiment 1. In addition, the present embodiment 3 is configured such that it includes the playback volume level memory (playback volume level memory means) 17 for storing the playback volume level of the sound data during the playback, and that the microcomputer 6 calculates, when the sound source is switched from the current sound data to the sound data which was played back in the past and whose playback volume level is stored in the playback volume level memory 17, the level difference between them by reading the playback volume level of the next sound data which is stored in the playback volume level memory 17. Therefore when switching from the piece of music A to the piece of music B, for example, the present embodiment 3 can obviate the need for moving the optical pickup to locate the start of the piece of music B to detect its playback volume level. Thus, it can calculate the level difference $\Delta P$ between the piece of music A and the piece of music B, and complete the start location processing of the piece of music B instantaneously, thereby offering an advantage of being able to adjust the volume in a very short time.

Embodiment 4

Figure 11:
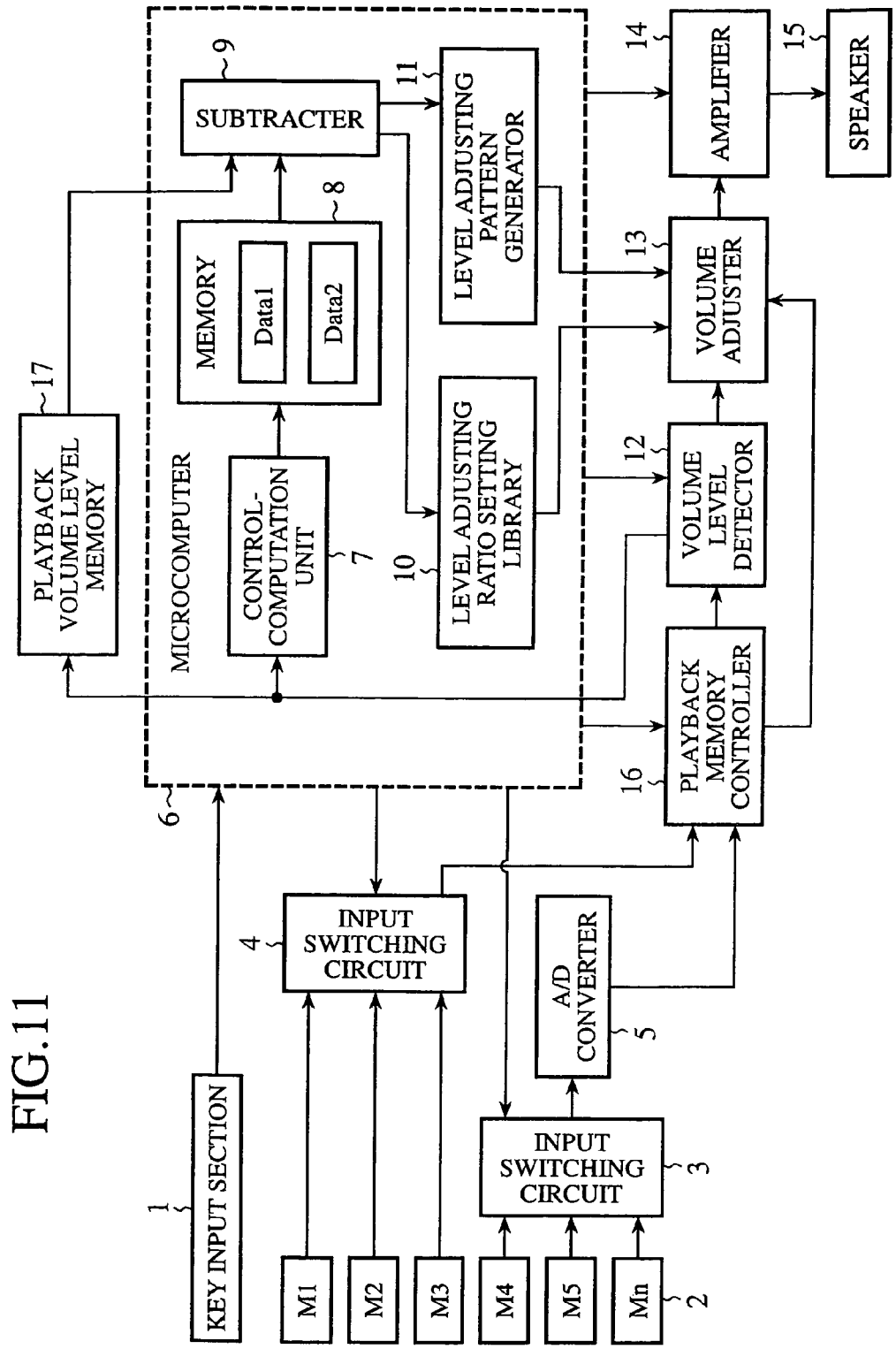
FIG. 11 is a block diagram showing a configuration of an embodiment 4 of the audio control system in accordance with the present invention.

FIG. 11 is a block diagram showing a configuration of an embodiment 4 of the audio control system in accordance with the present invention. In FIG. 11, the same components as those of the embodiment 1 as shown in FIG. 1 are designated by the same reference numerals, and the description thereof is omitted here. In FIG. 11, the playback memory controller 16 and playback volume level memory 17 are newly added. In other words, the configuration of FIG. 11 is a combination of the configuration of the embodiment 2 as shown in FIG. 8 and that of the embodiment 3 as shown in FIG. 9.

Next, the operation of the present embodiment 4 will be described.

Consider the case where the current sound data, the piece of music A, for example, is switched to the next sound data, the piece of music B, for example. As to the average detection level of the sound data of the piece of music A, it can be read from the playback memory controller 16. In addition, as to the average detection level of the sound data of the piece of music B, it can be read from the playback volume level memory 17 when it is stored therein. Accordingly, it becomes unnecessary to detect the two playback volume levels of the sound data and to store them in the Data1 and Data2 of the memory 8.

As described above, the present embodiment 4 offers an advantage of being able to adjust the playback volume level to the level that can meet the demand of the user as in the foregoing embodiment 1. In addition, the present embodiment 4 is configured such that it includes the playback memory controller 16 for storing the sound data supplied from the sound source and the playback volume level memory 17 for storing the playback volume level of the sound data during the playback, and that the microcomputer 6 calculates, when the sound source is switched from the current sound data to the sound data which was played back in the past and whose playback volume level is stored in the playback volume level memory 17, the level difference between them by reading the playback volume level of the current sound data which is stored in the playback memory controller 16 and the playback volume level of the next sound data which is stored in the playback volume level memory 17. Therefore when switching from the piece of music A to the piece of music B, for example, the present embodiment 4 can read the playback volume level of the currently played back piece of music A by only electrical processing, and can obviate the need for moving the optical pickup to locate the start of the piece of music B to detect its playback volume level. Thus, it can calculate the level difference $\Delta P$ between the piece of music A and the piece of music B, and complete the start location processing of the piece of music B instantaneously, thereby offering an advantage of being able to adjust the volume in a very short time.

Embodiment 5

Figure 12:
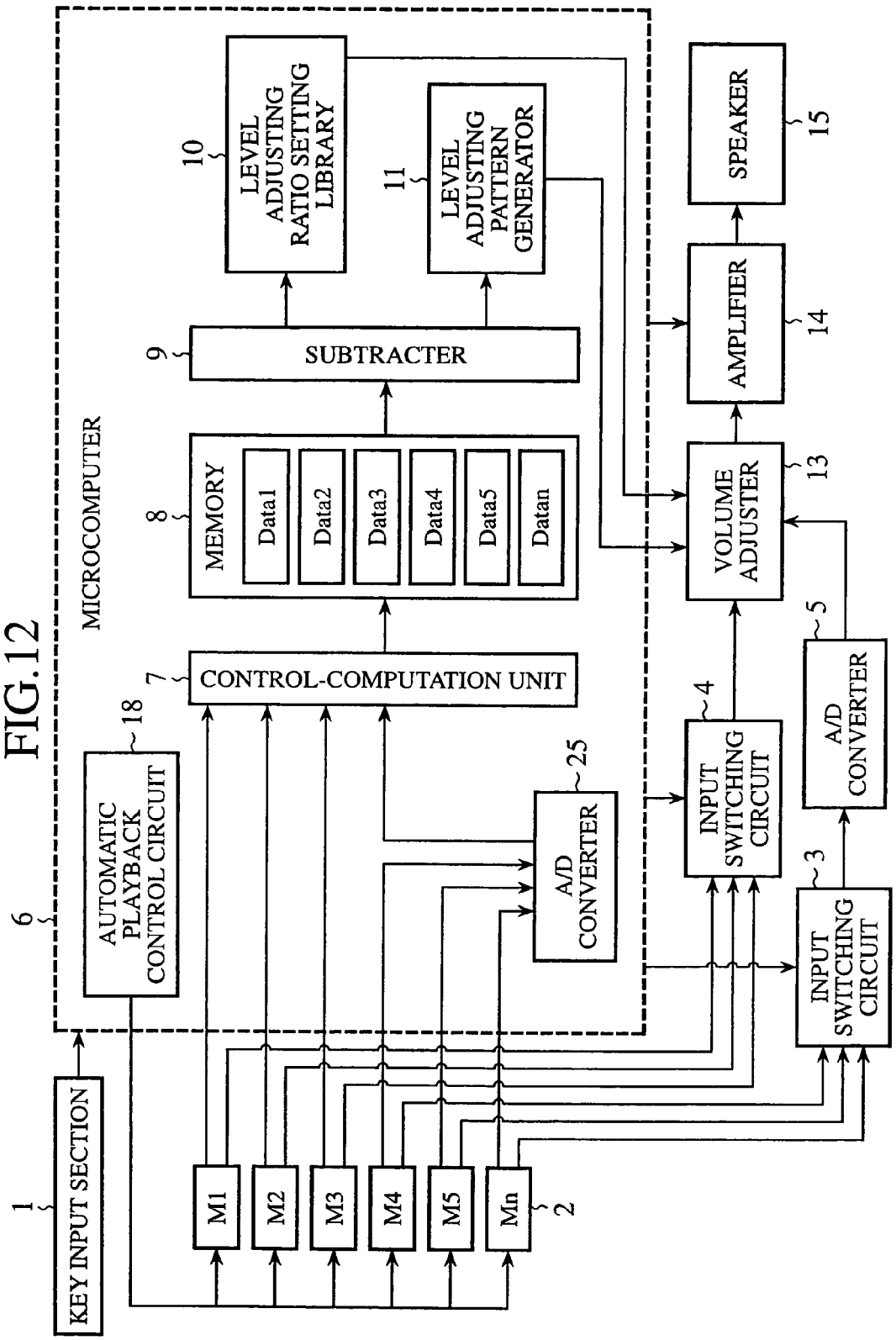
FIG. 12 is a block diagram showing a configuration of an embodiment 5 of the audio control system in accordance with the present invention.

FIG. 12 is a block diagram showing a configuration of an embodiment 5 of the audio control system in accordance with the present invention. In FIG. 12, the same components as those of the embodiment 1 as shown in FIG. 1 are designated by the same reference numerals, and the description thereof is omitted here. In FIG. 12, an automatic playback control circuit (automatic playback control means) 18 is newly added. In addition, memory areas Data1-Data*n* corresponding to the sound sources M1-M*n* are provided in the memory 8.

Next, the operation of the present embodiment 5 will be described.

The automatic playback control circuit 18 automatically plays back the sound data of the individual sound sources M1-M*n* in response to the initialization of the microcomputer 6. For the sake of simplicity, assume that the sound sources are all disks, each of which records a plurality of pieces of music (tracks). When the power is turned on or the disk is inserted, the automatic playback control circuit 18 automatically plays back all the tracks of the individual disks in the mute state. Thus, it detects the record volume level of the sound data of the individual tracks, and stores the average detection levels in the memory areas corresponding to the individual sound sources and the individual tracks in the memory 8. FIG. 13 is a table illustrating the data about the average detection levels stored in the memory 8.

Let us consider a case where the microcomputer 6 switches the track of the currently played back sound source to another track of the same or other sound source in response to the manipulation of the key input section 1 in the playback processing of the present embodiment 5. The microcomputer 6 reads the record volume level of the sound data of the current track from the memory 8, reads that of the next track, and calculates the level difference $\Delta P$ between them.

For example, assume that the current track is the track 2 of the sound source M5, and the next track is the track 1 of the sound source 2. In this case, referring to the data of the memory 8 as shown in FIG. 13, the microcomputer 6 reads the record volume level "60 dB" of the sound data of the current track, and the record volume level "40 dB" of the sound data of the next track. Then, it subtracts 40 dB from 60 dB, thereby obtaining the level difference "20 dB". Subsequently, it carries out the volume adjustment of increasing the playback volume level of the sound data of the next track by "20 dB".

As described above, the present embodiment 5 offers an advantage of being able to adjust the playback volume level to the level that can meet the demand of the user as in the foregoing embodiment 1. In addition, the present embodiment 5 is configured such that it includes the memory (record volume level memory means) 8 for storing the individual record volume levels of the sound data recorded in the plurality of sound sources M1-Mn to be selected by the microcomputer 6 to be played back, and that when the sound data of the current track is switched to that of the next track, the microcomputer 6 reads the record volume levels of the sound data of the current and next tracks, which are stored in the memory 8, and calculates the level difference between them, thereby offering an advantage of being able to adjust the volume in a very short time.

Embodiment 6

Figure 14:
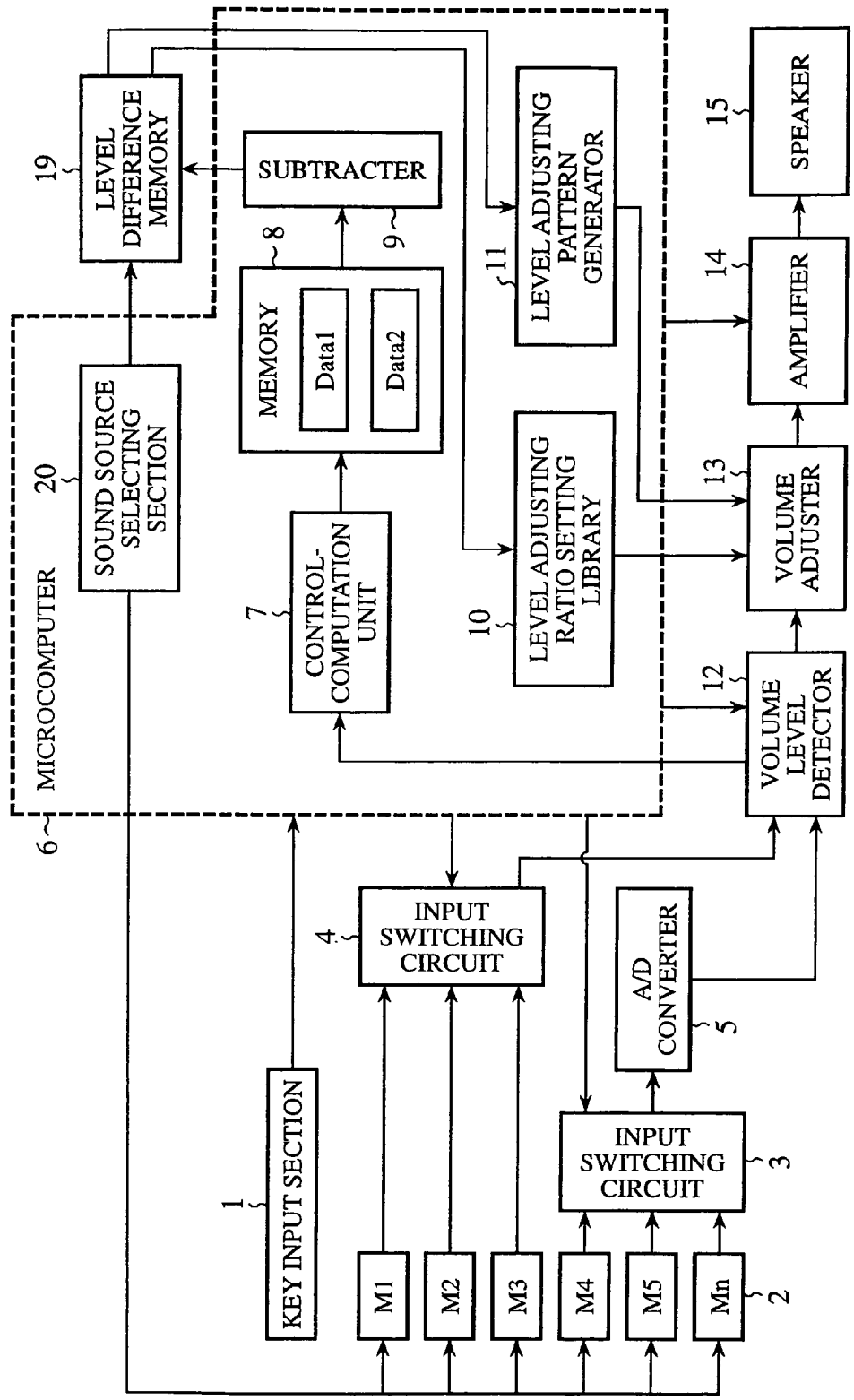
FIG. 14 is a block diagram showing a configuration of an embodiment 6 of the audio control system in accordance with the present invention.

FIG. 14 is a block diagram showing a configuration of an embodiment 6 of the audio control system in accordance with the present invention. In FIG. 14, the same components as those of the embodiment 1 as shown in FIG. 1 are designated by the same reference numerals, and the description thereof is omitted here. In FIG. 14, a level difference memory 19 is newly added as a database. Although a sound source selecting section 20 is shown in FIG. 14 as a part of the microcomputer 6 for selecting one of the sound sources M1-Mn, it is actually present in the foregoing embodiment 1 though not shown in FIG. 1. The sound source selecting section 20 supplies the control signal for designating the sound source to the level difference memory 19.

Next, the operation of the present embodiment 6 will be described.

The main routine of the microcomputer 6 of the present embodiment 6 is basically the same as that of the embodiment 1 as illustrated in FIG. 2. The main routine of the embodiment 6 differs in that it carries out database processing in the initialization. For the sake of simplicity, assume that the sound sources M1-Mn are each a record medium that records a plurality of pieces of music, that is, tracks.

In the database processing, the microcomputer 6 carries out the following processing. It reads the record volume level L(p) of an array {M(i), TR(j)} consisting of the sound source Mi designated by a pointer i and the track TR(j) designated by a pointer j in the sound source Mi, and stores it in the Data1 of the memory 8. Likewise, the microcomputer 6 reads the record volume level L(q) of an array {M(k), TR(m)} different from the array {M(i), TR(j)}, and stores it in the Data2 of the memory 8. Then, it has the subtracter 9 subtract the value of the Data2 from the value of the Data1, and stores the level difference ΔP(p, q) to the level difference memory 19. Then, the microcomputer 6 eliminates one of each two complementary arrays, and stores the level differences between the individual arrays in the level difference memory 19.

Figure 15:
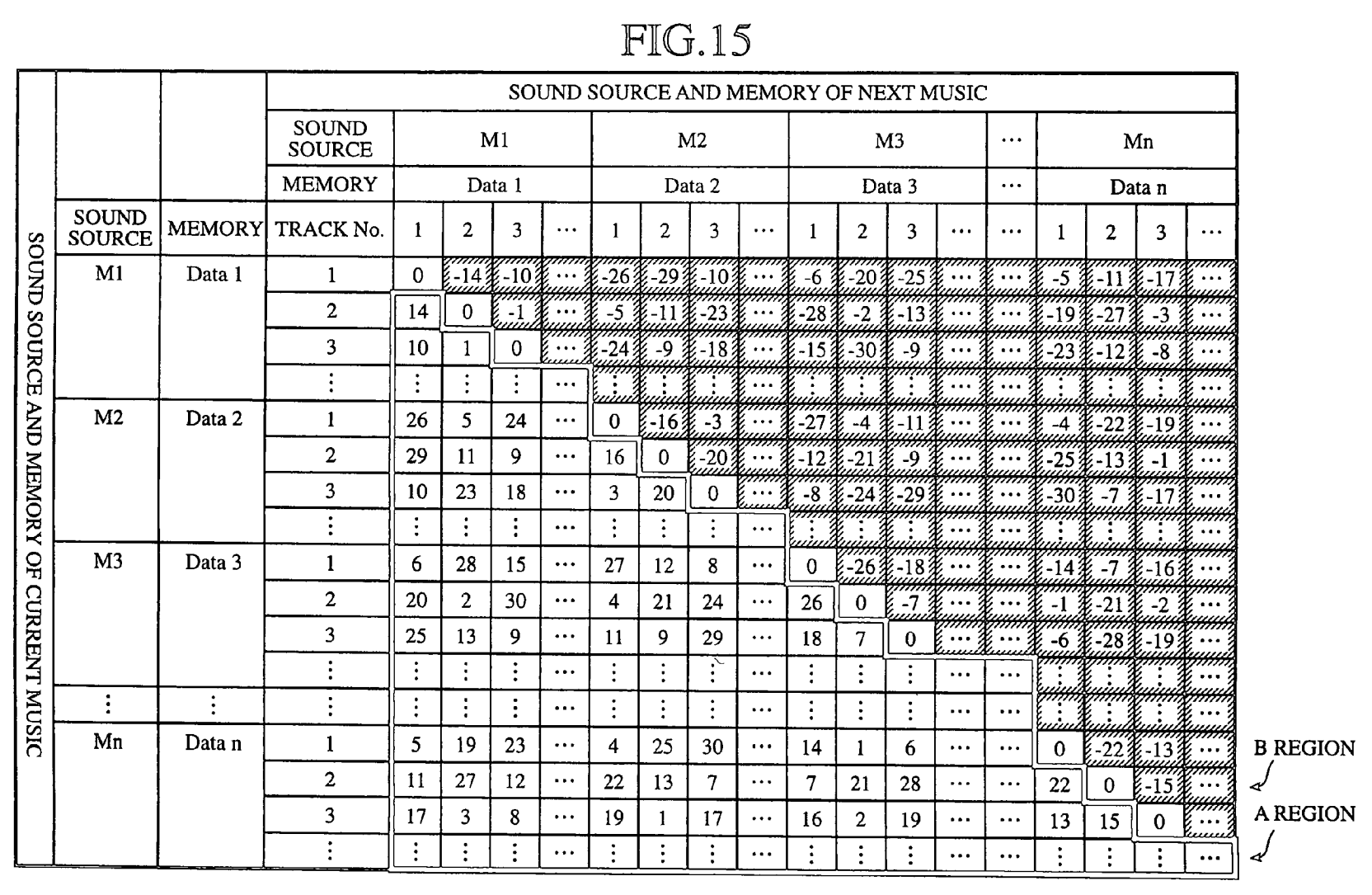

Therefore it is not necessary for the microcomputer 6 to calculate the complementary level difference ΔP(q, p), for example, by subtracting the record volume level L(p) of the array {M(i), TR(j)} from the record volume level L(q) of the array {M(k), TR(m)}. This is because the level difference ΔP(q, p) can be obtained by multiplying the level difference ΔP(p, q) by "−1". FIG. 15 is a table illustrating the data about the level differences stored in the level difference memory 19. Every time the sound data to be played back is switched in the playback processing, the microcomputer 6, referring to the level difference memory 19, reads the corresponding level difference, and carries out the volume adjustment.

As described above, the present embodiment 6 offers an advantage of being able to adjust the playback volume level to the level that can meet the demand of the user as in the foregoing embodiment 1. In addition, the present embodiment 6 is configured such that it includes the level difference memory (level difference memory means) 19 for storing the level differences between the individual playback volume levels of the sound data stored in the plurality of sound sources to be selected by the microcomputer 6, and that when the sound data of the current track is switched to that of the next track, the microcomputer 6 reads the level difference between the two sound data, which is stored in the level difference memory 19, and adjusts the playback volume level of the sound data of the next track, thereby offering an advantage of being able to adjust the volume in a very short time.

Although the foregoing embodiments are configured such that the level difference ΔP is obtained by subtracting the average of the playback volume levels of the next sound data from the average of the playback volume levels of the current sound data, the method of calculating the level difference ΔP is not limited to such a method of the foregoing embodiments.

FIGS. 16A-16D are diagrams each illustrating a method of detecting the level difference ΔP when the playback is changed from the piece of music A (track A) to the piece of music B (track B) in the case where the sound source is a disk such as a CD or MD.

Figure 16A:
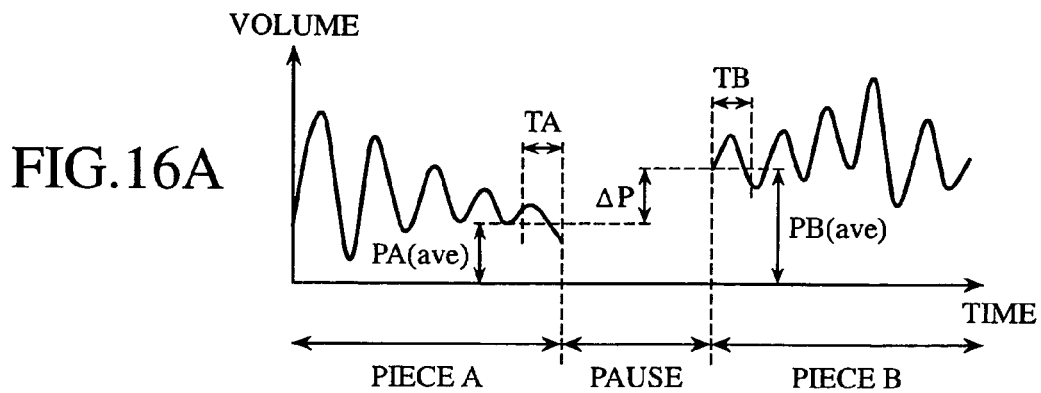
FIGS. 16A-16D are diagrams each illustrating detecting behavior of a level difference ΔP when the playback moves from a piece of music A to a piece of music B of a disk in the individual embodiments in accordance with the present invention.

FIG. 16A illustrates a method of obtaining the level difference ΔP between the average detection level PA(ave) during the specified time TA at the end of the piece of music A and the average detection level PB(ave) during the specified time TB at the start of the piece of music B by detecting them as in the TR volume adjustment in the foregoing embodiments.

Figure 16B:
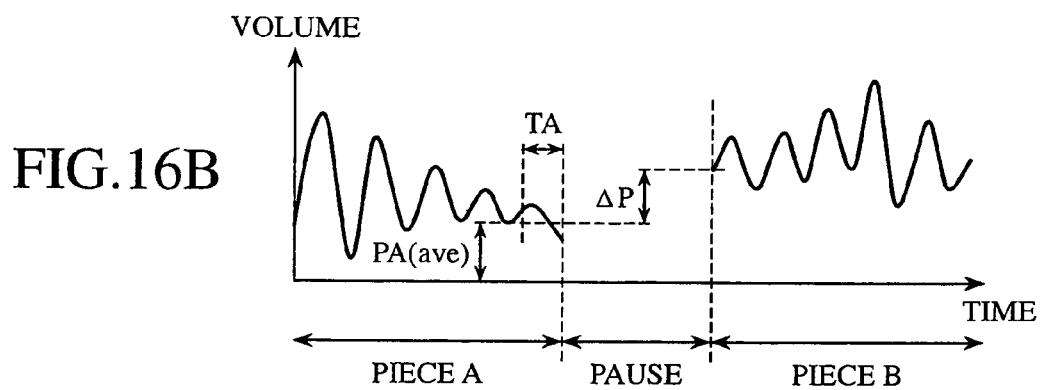

FIG. 16B illustrates a method of obtaining the level difference ΔP between the average detection level PA(ave) during the specified time TA at the end of the piece of music A and the initial playback volume level of the piece of music B by detecting them.

Figure 16C:
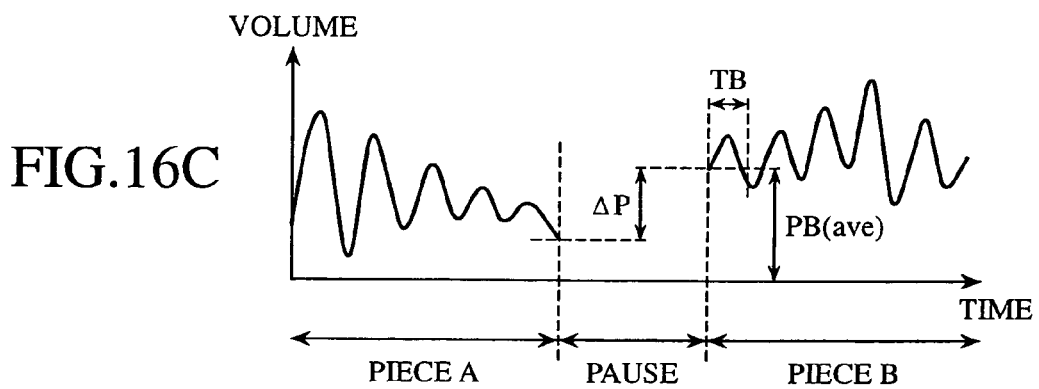

FIG. 16C illustrates a method of obtaining the level difference ΔP between the final playback volume level of the piece of music A and the average detection level PB(ave) during the specified time TB at the start of the piece of music B by detecting them.

Figure 16D:
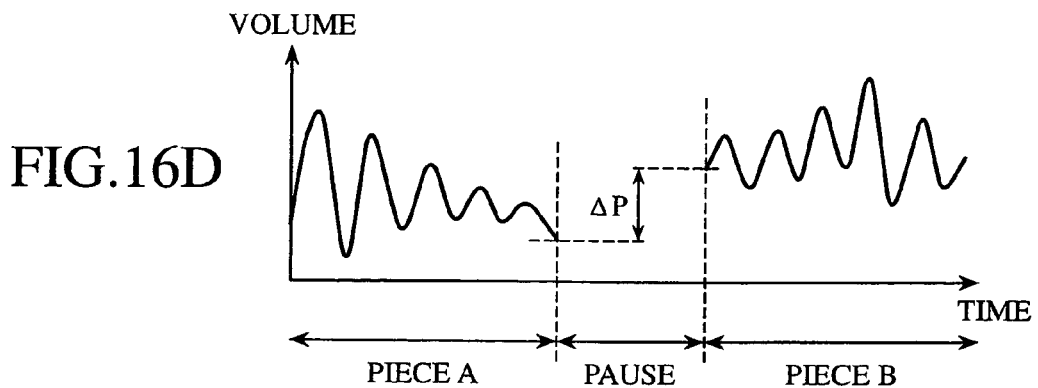

FIG. 16D illustrates a method of obtaining the level difference ΔP between the final playback volume level of the piece of music A and the initial playback volume level of the piece of music B by detecting them.

As for the level adjusting ratios that are set in the level adjusting ratio setting library 10 in the foregoing embodiments, a variety of variations are possible. FIGS. 17A-17D illustrate the variations of the level adjusting ratios available in the individual embodiment.

Figure 17A:
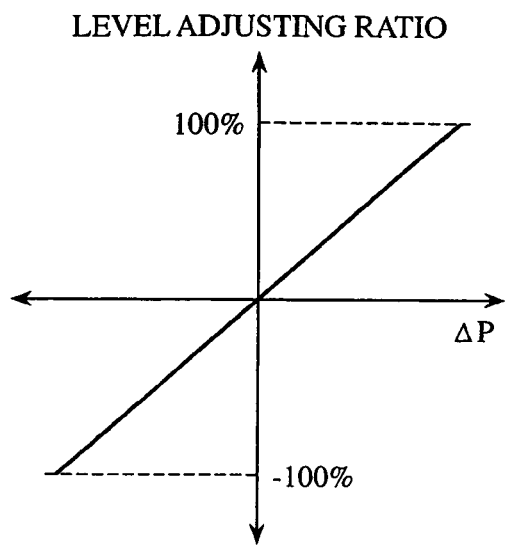
FIGS. 17A-17D are diagrams illustrating variations of the level adjusting ratio that is set in the individual embodiments in accordance with the present invention.

FIG. 17A is a diagram illustrating a method of adjusting the playback sound level of the next sound data in accordance with the adjusting ratio proportional to the level difference between the playback volume level of the current sound data and that of the next sound data.

Figure 17B:
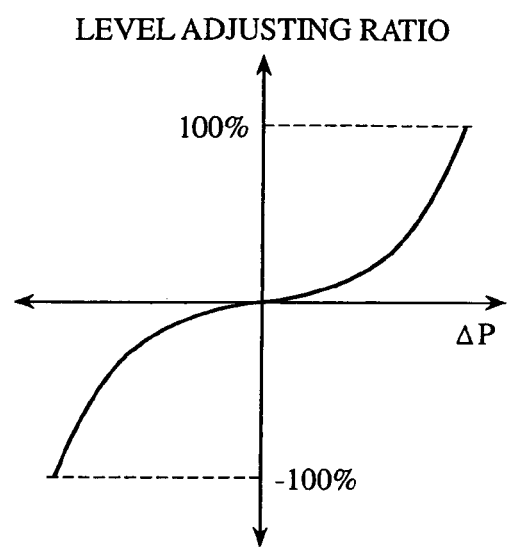

FIG. 17B is a diagram illustrating a method of adjusting the playback sound level of the next sound data in accordance with the adjusting ratio proportional to the square of the level difference between the playback volume level of the current sound data and that of the next sound data.

Figure 17C:
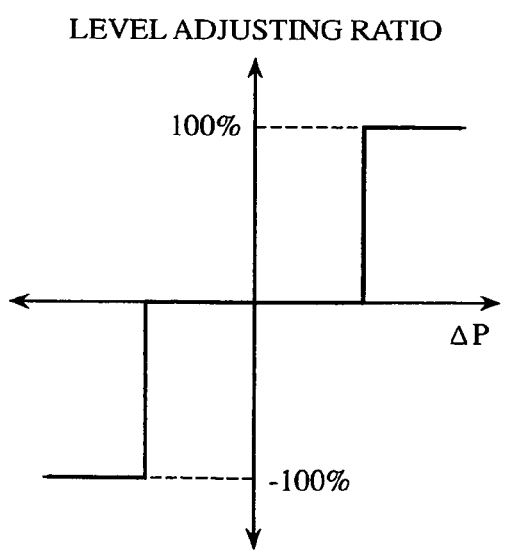

FIG. 17C is a diagram illustrating a method of adjusting the playback sound level of the next sound data in accordance with a fixed adjusting ratio when the level difference between the playback volume level of the current sound data and that of the next sound data exceeds a specified value.

Figure 17D:
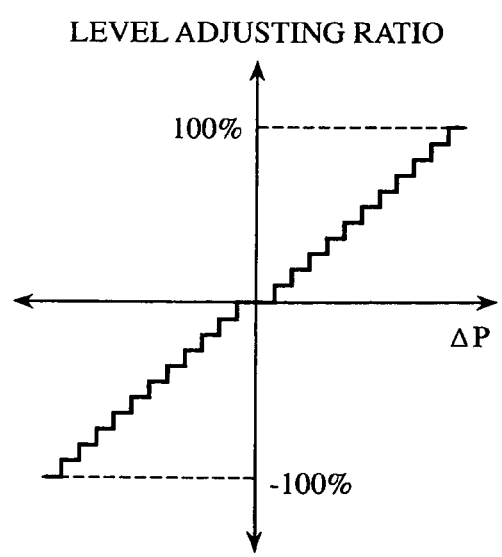

FIG. 17D is a diagram illustrating a method of adjusting the playback sound level of the next sound data in accordance with the adjusting ratio increasing stepwise in proportion to the level difference between the playback volume level of the current sound data and that of the next sound data.

Figure 18A:
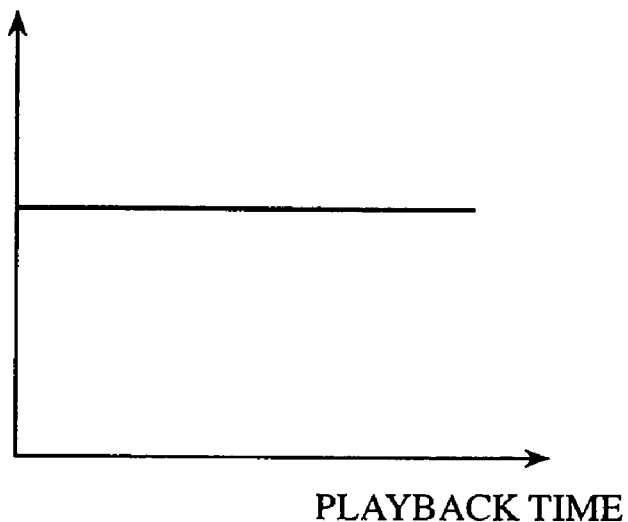
FIGS. 18A and 18B are graphs each illustrating a pattern corresponding to a progress of the playback against the level adjusting ratio in the individual embodiments in accordance with the present invention.
Figure 18B:
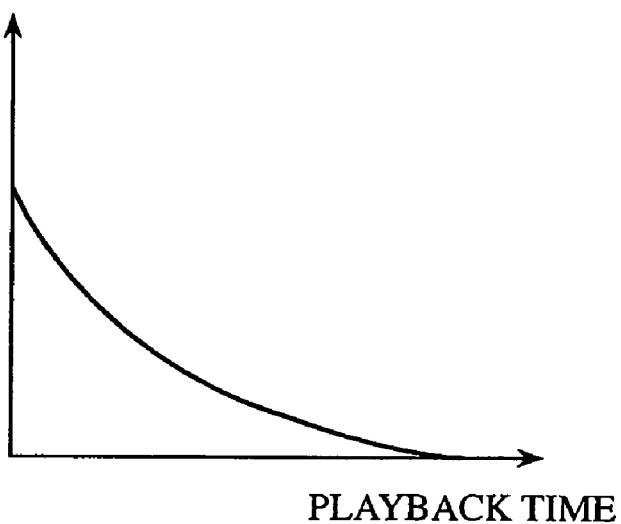

Moreover, for the level adjusting ratios that are set by the level adjusting ratio setting library 10, the level adjusting ratio pattern generator 11 sets a temporal transition, that is, a pattern in accordance with the progress of the playback. FIGS. 18A and 18B are diagrams each illustrating a pattern for the level adjusting ratio with the progress of the playback time in the foregoing embodiments.

FIG. 18A is a diagram illustrating a pattern of a fixed level adjusting ratio regardless of the progress of the playback.

FIG. 18B is a diagram illustrating a pattern of a gradually decreasing level adjusting ratio with the progress of the playback.

What is claimed is:

1. An audio system comprising:
   an input section for inputting a selection instruction for selecting one of a plurality of sound sources that supply sound data including music data on a piece of music and a broadcast signal received;
   a sound source selector for selecting a sound source designated by the selection instruction;
   a processor for calculating a level difference between a playback volume level of first sound data currently played back and a playback volume level of second sound data to be played back next in the sound source selected by said sound source selector; and
   a volume adjuster for adjusting the playback volume level of the second sound data in accordance with an adjusting ratio set in response to the level difference,
   wherein when the first sound data completes its playback and is switched to the second sound data, said processor detects the playback volume level of the second sound data by playing back part of the second sound data and then by returning the playback position.

2. An audio system comprising:
   an input section for inputting a selection instruction for selecting one of a plurality of sound sources that supply sound data including music data on a piece of music and a broadcast signal received;
   a sound source selector for selecting a sound source designated by the selection instruction;
   a processor for calculating a level difference between a playback volume level of first sound data currently played back and a playback volume level of second sound data to be played back next in the sound source selected by said sound source selector;
   a volume adjuster for adjusting the playback volume level of the second sound data in accordance with an adjusting ratio set in response to the level difference; and
   a data memory for storing sound data fed from one of said sound sources, wherein when the first sound data is switched to the second sound data, said processor calculates the level difference by reading the playback volume level of the second sound data stored in said data memory.

3. An audio system comprising:
   an input section for inputting a selection instruction for selecting one of a plurality of sound sources that supply sound data including music data on a piece of music and a broadcast signal received;
   a sound source selector for selecting a sound source designated by the selection instruction;
   a processor for calculating a level difference between a playback volume level of first sound data currently played back and a playback volume level of second sound data to be played back next in the sound source selected by said sound source selector;
   a volume adjuster for adjusting the playback volume level of the second sound data in accordance with an adjusting ratio set in response to the level difference; and
   a volume level memory for storing the playback volume level of current sound data, wherein when the first sound data is switched to the second sound data which was played back once in the past, and the playback volume level of which is stored in said playback volume level memory means, said processor calculates the level difference between the playback volume level of the first sound data and that of the second sound data by reading the playback volume level of the second sound data stored in said playback volume level memory.

4. The audio system according to claim 3, further comprising a data memory for storing sound data supplied from one of said sound sources,
   wherein the volume level memory is a playback volume level memory for storing the playback volume level of current sound data, and
   wherein when the first sound data is switched to the second sound data which was played back once in the past, and the playback volume level of which is stored in said playback volume level memory, said processor reads the playback volume level of the first sound data stored in said data memory, and the playback volume level of the second sound data stored in said playback volume level memory, and calculates the level difference between the two playback volume levels.

5. The audio system according to claim 3, wherein the volume level memory is a record volume level memory for storing record volume levels of individual sound data that are stored in said plurality of sound sources to be selected by said sound source selector, and
   wherein when first sound data in the current sound source is switched to second sound data in one of the current sound source and another sound source associated with a selection instruction from said input section, said processor reads the record volume level of the first sound data and that of the second sound data stored in said record volume level memory, and calculates the level difference between the two record volume levels.

6. The audio system according to claim 5, further comprising an automatic playback controller for automatically playing back the sound data recorded in a sound source inserted, wherein said processor detects the playback volume level of the sound data played back by said automatic playback controller, and stores the detected playback volume levels to said record volume level memory.

7. An audio system comprising:
   an input section for inputting a selection instruction for selecting one of a plurality of sound sources that supply sound data including music data on a piece of music and a broadcast signal received;
   a sound source selector for selecting a sound source designated by the selection instruction;
   a processor for calculating a level difference between a playback volume level of first sound data currently played back and a playback volume level of second sound data to be played back next in the sound source selected by said sound source selector;

a volume adjuster for adjusting the playback volume level of the second sound data in accordance with an adjusting ratio set in response to the level difference; and a level difference memory for storing level differences between playback volume levels of individual sound data that are stored in said plurality of sound sources to be selected by said sound source selector, wherein when first sound data in the current sound source is switched to second sound data in one of the current sound source and another sound source associated with the selection instruction from said input section, said processor reads the level difference between the first sound data and the second sound data stored in said level difference memory, and adjusts the playback volume level of the second sound data.

8. The audio system according to claim 1, wherein said processor calculates the level difference by detecting an average value of the playback volume level of the first sound data and an average value of the playback volume level of the second sound data.

9. The audio system according to claim 1, wherein said processor calculates the level difference by detecting an average value of the playback volume level of the first sound data and an initial value of the playback volume level of the second sound data.

10. The audio system according to claim 1, wherein said processor calculates the level difference by detecting a final value of the playback volume level of the first sound data and an average value of the playback volume level of the second sound data.

11. The audio system according to claim 1, wherein said processor calculates the level difference by detecting a final value of the playback volume level of the first sound data and an initial value of the playback volume level of the second sound data.

12. The audio system according to claim 1, wherein said volume adjuster adjusts the playback volume level of the second sound data in accordance with an adjusting ratio proportional to the level difference between the playback volume level of the first sound data and the playback volume level of the second sound data.

13. The audio system according to claim 1, wherein said volume adjuster adjusts the playback volume level of the second sound data in accordance with an adjusting ratio proportional to the square of the level difference between the playback volume level of the first sound data and the playback volume level of the second sound data.

14. The audio system according to claim 1, wherein said volume adjuster adjusts the playback volume level of the second sound data in accordance with a fixed adjusting ratio when the level difference between the playback volume level of the first sound data and the playback volume level of the second sound data exceeds a specified value.

15. The audio system according to claim 1, wherein said volume adjuster adjusts the playback volume level of the second sound data in accordance with an adjusting ratio increasing stepwise in proportion to the level difference between the playback volume level of the first sound data and the playback volume level of the second sound data.

16. The audio system according to claim 12, wherein said volume adjuster maintains during the playback of the second sound data a level adjusting rate of the adjusting ratio that is set in accordance with the level difference between the playback volume level of the first sound data and the playback volume level of the second sound data.

17. The audio system according to claim 12, wherein said volume adjuster gradually reduces a level adjusting rate of the adjusting ratio, which is set in accordance with the level difference between the playback volume level of the first sound data and the playback volume level of the second sound data, in accordance with progress of the playback of the second sound data.

* * * * *